United States Patent [19]

Burris

[11] 4,414,809

[45] Nov. 15, 1983

[54] HYDRAULIC POWER STEERING AND COOLING FAN DRIVE SYSTEM FOR VEHICLES

[75] Inventor: Darryl L. Burris, Lansing, Mich.

[73] Assignee: General Motors Corporation, Detroit, Mich.

[21] Appl. No.: 201,513

[22] Filed: Oct. 28, 1980

[51] Int. Cl.³ ............................................. F15B 11/16
[52] U.S. Cl. ...................................... 60/424; 60/468; 60/494
[58] Field of Search ......................... 60/424, 468, 494

[56] References Cited

U.S. PATENT DOCUMENTS

| | | | |
|---|---|---|---|
| 3,575,192 | 4/1971 | MacDuff | 137/116 |
| 3,641,879 | 2/1972 | Week et al. | 60/424 X |
| 3,787,029 | 1/1974 | Shellhause | 251/333 |
| 4,129,258 | 12/1978 | Mott et al. | 60/424 X |

Primary Examiner—Arnold Rosenthal
Attorney, Agent, or Firm—Charles R. White

[57] ABSTRACT

Power steering pump is employed to provide power for engine cooling fan drive. Bypass oil or bypass oil in addition to return oil is routed from the power steering gear through the fan drive motor for improved fan drive operation.

2 Claims, 1 Drawing Figure

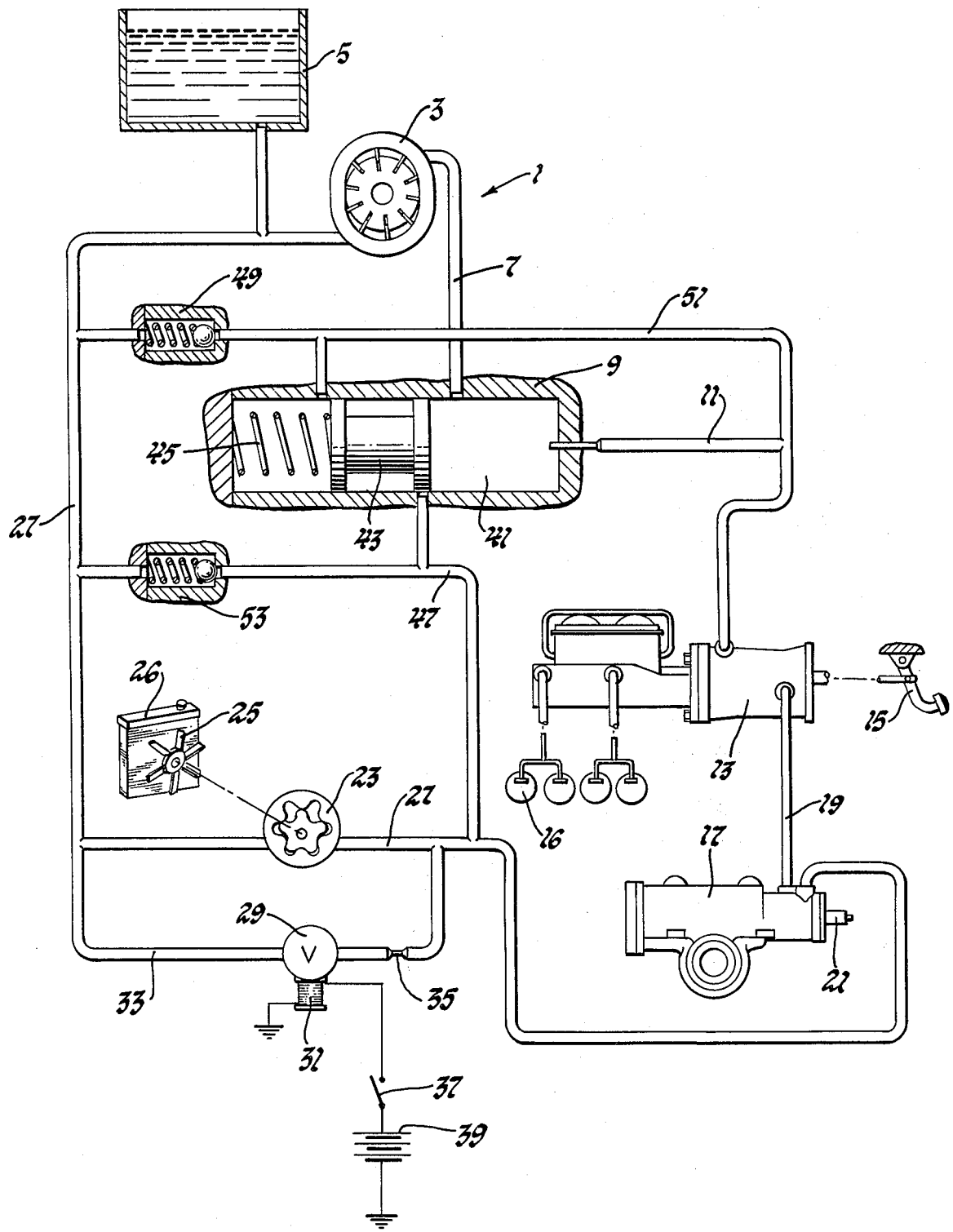

HYDRAULIC POWER STEERING AND COOLING FAN DRIVE SYSTEM FOR VEHICLES

This invention relates to hydraulic control systems and more particularly to a new and improved hydraulic engine cooling fan drive and power steering system for vehicles.

In this invention a hydraulic pump such as a conventional engine driven power steering pump is utilized to provide hydraulic power for power steering, brake boost and for a hydraulic motor powering an engine cooling fan. In the preferred embodiment of this invention (1) return oil from the power steering gear or (2) bypass oil from the pump plus the steering gear return oil is effectively routed through the fan drive motor for motor drive so that the fan can pump sufficient cooling air through the radiator for engine cooling purposes. In this invention there is power responsive engine cooling fan drive, improved control of fan speed and more efficient and effective use of the engine driven power steering pump.

Generally, conventional hydraulic vane pumps used in hydraulic steering gear systems of many vehicles have a high output in terms of oil volume when the engine is operating at high speeds. Under such conditions; power steering pressure demand is frequently low. Pressure buildup is relieved through a flow control valve and bypass circuit connected to the reservoir so that system operation is normal with little heat buildup. If a hydraulic engine cooling fan motor is introduced directly into the constant flow line from the power steering gear, the pressure demand would rise when the fan pumps air for engine cooling purposes. Under such conditions a heat buildup would occur such that the pump pressure and available power would be severely limited. However, with this invention such difficulties are avoided with a new and improved hydraulic power system in which the fan motor receives oil from the power steering pump and under certain conditions from the power flow control valve so that most all of the power supplied by the pump vanes is used to do the work in powering the hydraulic units and in turning the fan motor. When steering and brake boost demands are high, the system provides for return oil from the brake booster and steering gear to be routed through the fan motor for effective drive of the fan. When these demands are low, return oil plus bypass oil is routed through the fan motor for fan drive. With this system there is less wasted heat and more efficient fan drive as compared to the prior constructions. Also, there is greater design flexibility for installations in which mechanical drive of the fan motor from the engine is not practical and electric fan drive is not desired.

These and other features, objects and advantages of this invention will be more apparent from the following detailed description and drawings in which:

The FIGURE is a diagrammatic representation of the preferred hydraulic system which incorporates a power steering gear, brake booster and engine cooling fan drive.

The FIGURE illustrates a hydraulic system 1 which incorporates a conventional vaned power steering gear pump 3 that preferably corresponds to that of U.S. Pat. No. 3,207,077 issued Sept. 21, 1965 to Ziegler et al hereby incorporated by reference. The pump 3 draws oil from the reservoir 5 for delivery through passage 7 to a flow control valve 9, which may be housed with the pump, and then through a passage 11 to a hydraulic brake booster 13 corresponding to that disclosed in U.S. Pat. No. 3,787,029 issued Jan. 22, 1974 to Shellhause hereby incorporated by reference. Manual depression of a conventional brake pedal 15 by the vehicle operator actuates booster 13 for actuation of hydraulically actuated vehicle brake units 16. In addition to supplying pressure fluid to the brake booster 13, the pump 3 supplies the power steering gear 17 which is hydraulically connected in series with the brake booster 13 by line 19.

The steering gear 17 corresponds to that disclosed in U.S. Pat. No. 3,022,722 issued Feb. 27, 1962 to P. B. Ziegler et al hereby incorporated by reference. This steering gear provides for power assist steering of the dirigible wheels of the vehicle, not shown, in response to rotary input to the stub shaft 21 by manual actuation of the steering handwheel. A rotary hydraulic motor 23 is drivingly connected to a rotatable engine cooling fan 25 which draws air through radiator 26 conventionally connected to the vehicle engine not shown. Moror 23 is hydraulically interconnected in return line 27 that extends from the outlet of the power steering gear 17 to the reservoir 5 and then to the intake of power steering pump 3. Fan motor speed is controlled by a hydraulic control valve 29, operated by solenoid 31, which is hydraulically connected in parallel with the fan motor by line 33. This line contains fan idle orifice 35 that restricts flow through the line 33 so that the fan is driven by motor 23 at an idle speed when the valve 29 is open and at a high speed when closed. The solenoid 31 may be controlled by a thermal switch 37 mounted in the coolant within the radiator 26 to sense temperature of the circulating engine coolant therein. When conditions are such that the thermal switch 37 is closed, a battery 39 energizes the solenoid 31 to close the valve 29 so that line 33 is blocked and all bypass flow is through the line 27 to effect high speed fan operation.

The flow control valve 9 generally functions as described in U.S. Pat. No. 3,207,077 cited above. When a pressure buildup in the chamber 41 occurs, as when the vehicle engine speed is high and steering and brake demand are low, the valve element 43 shifts to the left against the action of spring 45. This opens up the bypass line 47 which connects into the return line 27 downstream of the power steering gear 17 and ahead of hydraulic motor 23 and its control valve 29. Under such conditions bypass oil through line 47 in addition to return oil from the steering gear provides for the high speed drive of the fan motor for highly effective dissipation of heat energy in the coolant circulating through the radiator. The ball check valve 49 interposed in line 51 leading from the supply line 11 to the return line 27 is a pressure regulator which dumps fluid back to the reservoir 5 in the event of any pressure buildup in the supply to the brake booster and power steering. When there is little pressure buildup in chamber 41, the valve element 43 remains in its illustrated blocking position so that the fan is driven by oil discharged by the steering gear. A ball check valve 53 similar to valve 49 limits circuit pressure downstream of the flow control valve and the power steering gear. This protects the fan motor and opens to relieve high pressures which otherwise might occur across the fan motor.

This invention accordingly makes more effective and efficient use of the steering gear pump with the employment of bypass oil, normally returned to the reservoir, as a drive for the hydraulic fan motor at high or low speed in accordance with cooling requirements. This invention provides an effective alternative to prior mechanical and electrically powered fan drives and provides flexibility for employment in transverse as well as more conventional engine arrangements.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A hydraulic drive system in a vehicle for powering hydraulically driven vehicle accessories comprising a rotary hydraulic fan drive motor and a hydraulically powered steering gear hydraulically connected in series and with the steering gear having power priority over said motor, a fluid reservoir, hydraulic pump means for pumping fluid from said reservoir to said steering gear and to said hydraulic fan drive motor for powering said steering gear and fan drive motor, first fluid passage means hydraulically connecting the output of said hydraulic pump means to said steering gear, second fluid passage means for connecting the hydraulic output of said steering gear to said fan drive motor and from said motor to said reservoir for the continuous supply of pressure fluid for the hydraulic drive of said steering gear and said fan, flow control valve means hydraulically connected in said first passage means triggered when pressure demand from said steering gear drops below a predetermined pressure level for diverting a portion of the output of said hydraulic pump means to said fan drive motor in response to the predetermined buildup of fluid pressure in said accessory so that said fan drive motor is simultaneously driven by return fluid supplied from said steering gear and by bypass fluid from said control valve means.

2. A drive system in a vehicle for powering hydraulically driven vehicle accessories comprising a rotary hydraulic engine cooling fan drive motor and a hydraulically powered vehicle steering gear hydraulically connected in series with said motor and having power priority thereover, a fluid reservoir, hydraulic pump means driven by a vehicle engine for pumping fluid from said reservoir to said power steering gear and to said hydraulic fan drive motor, first passage means hydraulically connecting the output of said hydraulic pump means to said power steering gear, second fluid passage means for connecting the hydraulic output of said power steering gear to said hydraulic fan drive motor for the continuous supply of hydraulic fluid thereto for the hydraulic drive thereof, said fan drive motor having a hydraulic discharge connected to said reservoir, hydraulic flow control valve means operatively connected in said first passage means, third fluid passage means connecting said valve means to said motor, said valve means having valve spool means therein for diverting a portion of the output of said hydraulic pump means to said fan drive motor in response to the decrease in hydraulic power demand by said accessory so that said hydraulic motor fan means is simultaneously driven by the return oil from said steering gear and by bypass oil from said control valve means, said valve spool means being movable to a blocking position in response to an increase in power steering gear demand so that the fan drive motor means is hydraulically driven solely by oil discharged by said power steering gear.

* * * * *